June 30, 1931.  L. DINESEN  1,812,086
MILKING APPARATUS
Filed Feb. 21, 1929  3 Sheets-Sheet 1
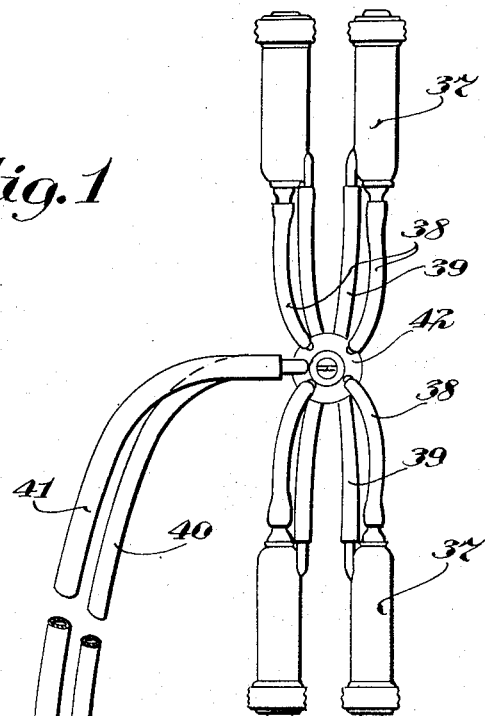
Fig.1
Fig.6
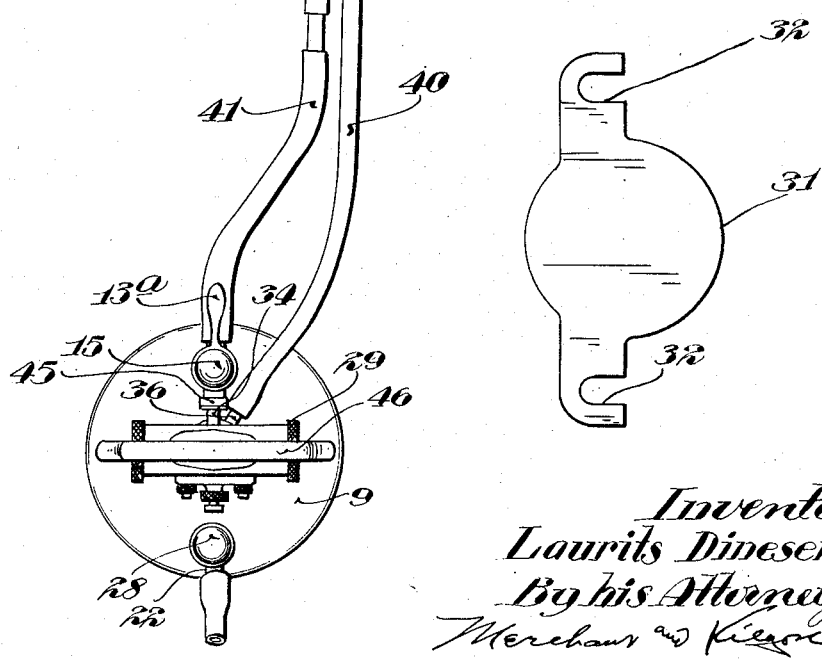
Inventor
Laurits Dinesen
By his Attorneys
Merchant and Kiesor

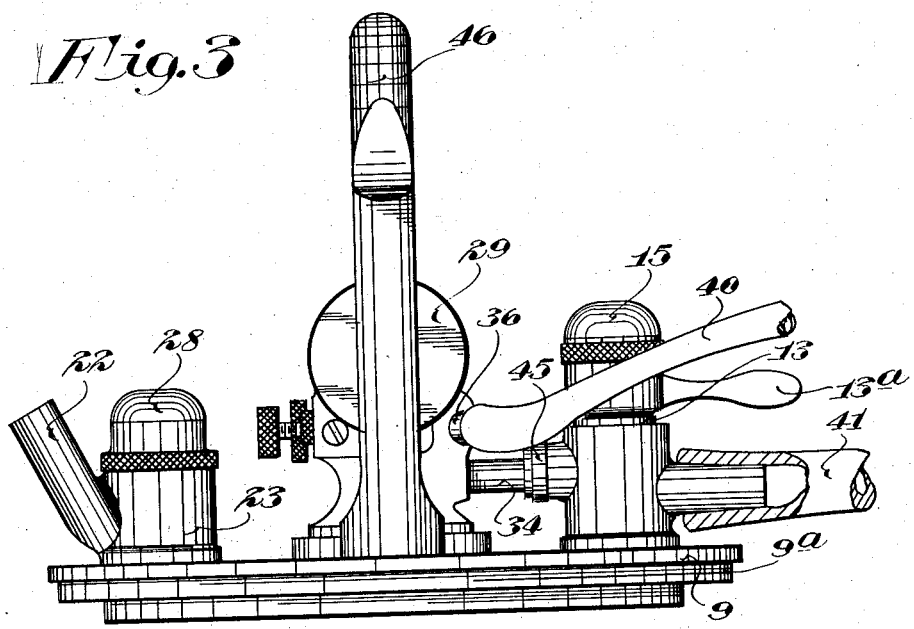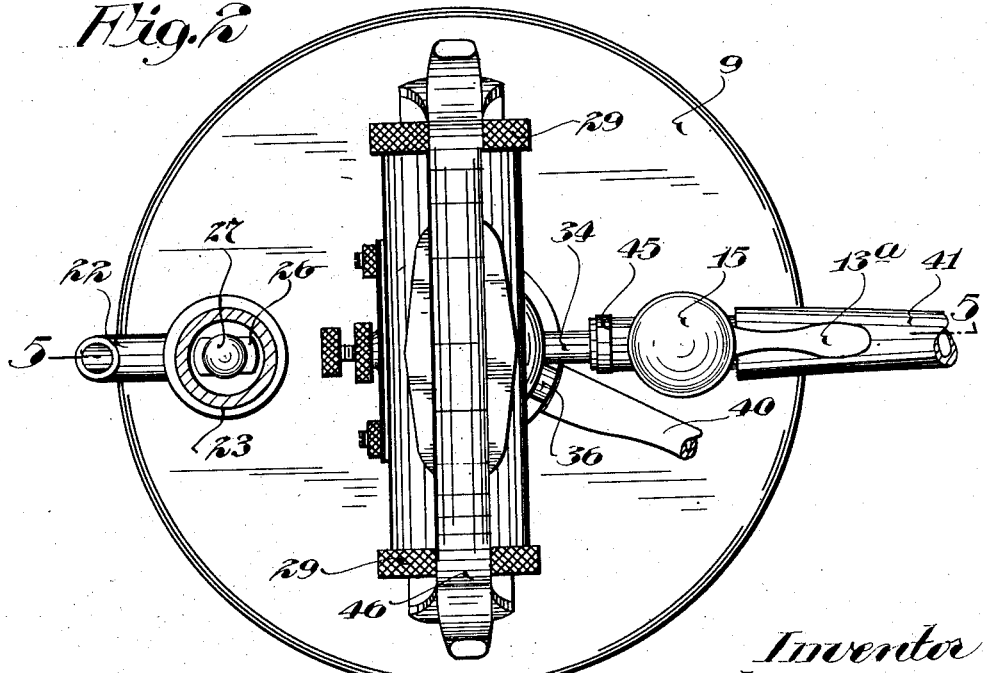

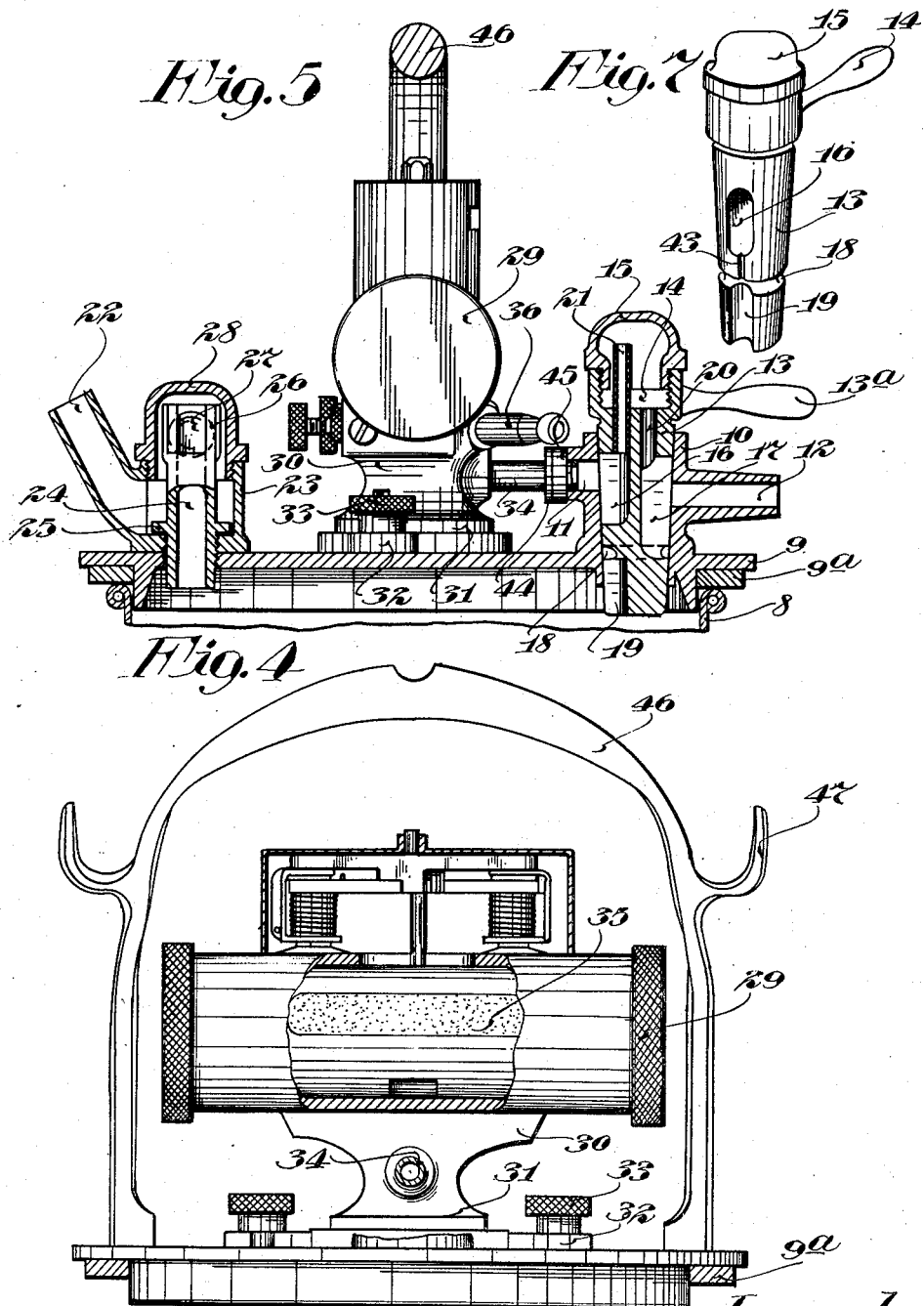

Patented June 30, 1931

1,812,086

UNITED STATES PATENT OFFICE

LAURITS DINESEN, OF MINNEAPOLIS, MINNESOTA

MILKING APPARATUS

Application filed February 21, 1929. Serial No. 341,639.

My present invention relates to milking apparatus and is in the nature of an improvement on or a modification of the milking apparatus disclosed and claimed in my prior Patent No. 1,583,580, of date May 4, 1926.

Generally stated, the invention consists of the novel devices, combinations of devices and arrangement of parts hereinafter described and defined in the claims, and which novel features will more fully appear from the description of a commercial apparatus illustrated in the accompanying drawings, wherein like characters indicate like parts throughout the several views.

Referring to the drawings:

Fig. 1 is a diagrammatic plan view illustrating the apparatus;

Fig. 2 is a plan view of the cover, pulsator and connected parts of the apparatus;

Fig. 3 is a side elevation of the parts shown in Fig. 2, some parts being sectioned;

Fig. 4 is a front elevation of the parts shown in Fig. 2, with some parts removed and with some parts broken away;

Fig. 5 is a vertical section taken on the line 5—5 of Fig. 2;

Fig. 6 is a bottom plan view of the pulsator showing the same removed from the cover of the container; and Fig. 7 is a perspective view of the cut-off valve.

In accordance with this invention, the pulsator of the apparatus is applied on the cover of the milk container or receptacle; the pulsator is operated from partial vacuum maintained in the milk receptacle; the milk receptacle is connected to the inner chambers of the double-chambered teat cups through a flexible tube; the pulsator is connected to the outer chambers of the teat cups through a flexible tube; and suction or partial vacuum is rendered effective on the teat cups and on the pulsator through a common cut-off valve of normal construction and arrangement.

The milk container or receptacle which is indicated in part by the numeral 8 is provided with a detachable cover 9 made air-tight by a suitable gasket 9ª. This cover is provided, at a point offset from its center, with an upstanding sleeve-like valve casing 10 which has an inwardly-projecting nipple 11 and an outwardly-projecting nipple 12. Working with an air-tight joint in the valve casing 10 is a tapered oscillatory cut-off valve 13 which, at its upper end, has a projecting handle 13ª. At its upper end, valve 13 has a chamber 14 closed by a detachable cap 15. In its opposite sides, valve 13 has vertically elongated ports 16 and 17 that terminate within the valve casing 10 and are arranged in one position of the valve to register, respectively, with the nipples 11 and 12. Port 17 extends farther down than port 16 and by a peripheral groove 18 is in constant communication with a longitudinal groove or port extension 19, that is constantly open to the interior of the container 7. A small duct 20 connects port 17 to cap covered chamber 14. A small tube 21 connects port 16 to the chamber 14 and extends far up into the cap 15 and far above the bottom of the chamber 14, this being done for a purpose which will hereinafter appear.

Partial vacuum will be maintained in the container 8 by means of a vacuum pump or the like which, by a suitable pipe or tube, not shown, will be connected to a nipple 22 formed on a valve housing 23 applied on top of the cover 9, preferably but not necessarily at a point diametrically opposite the valve casing 10. In the structure illustrated, this valve housing 23 is tightly clamped onto the cover by an interior tube 24 and provided with a flange 25 that quite closely fits the cylindrical interior of the housing 23 and is tightly clamped onto the bottom of said housing by threaded engagement between said tube and the cover. The upper end of tube 24 is enlarged and bifurcated so that it forms a flat head 26 that holds in position an upwardly opening check valve in the form of a ball 27. The flattened head 26 makes it feasible to apply a wrench thereto. The top of the valve housing 23 is closed and the head of the tube 24 is covered by a cap 28 detachably applied to said housing.

As already indicated, the pulsator for producing pressure pulsations in the double-chambered teat cups is directly applied on the cover. This pulsator may vary in form but preferably may be assumed to be of the type disclosed in my prior patent above identified. The cylinder 29 of this pulsator is preferably formed integral with a small standard 30, the base flange 31 of which is formed with slots 32 that face toward the valve casing 10. Clamping screws 33 work through the slots 32 and have threaded engagement with the cover 8. Projecting from the standard 30 is a suction tube 34 that corresponds to the suction or vacuum nipple 52 of said prior patent and through ports in the cylinder casting and in a piston 35 that works in cylinder 29 cause vacuum pulsations in a nipple 36 that projects from the cylinder 29.

In Fig. 1, the numeral 37 indicates a cluster of double-chambered teat cups, the inner chambers of which are connected to the outer ends of short flexible tubes 38 and the outer chambers of which are connected to the outer ends of short flexible tubes 39. Long flexible tubes 41 and 40 extend, respectively, from the milk-receiving nipple 12 of valve casing 10 and from the suction or vacuum nipple 36 of the pulsator. The extended ends of tubes 41 and 40 are connected, respectively, to the inner ends of short tubes 38 and 39 through a coupling head 42 such, for example, as illustrated in my prior patent, above identified, and which construction as well as that of the pulsator are now well known to those familiar with the milking machine art.

By reference particularly to Fig. 7, it will be noted that the lower extremity of the port 16 is constantly connected to groove 18 by a very small leakage passage 43 and the purpose of this will presently appear in the description of the operation. By reference to Fig. 5, it will be noted that nipple 34 is arranged to telescope into nipple 11. Also it will be noted that nipple 34 has an outstanding shoulder 44 between which and the end of nipple 11 a soft rubber gasket 45 is interposed. Preferably and as shown, cover 9 is provided with a yoke-like carrying handle 46 equipped with hooks 47, which latter will serve to hold teat cups to the container when not in use, but these features, however, constitute no part of the present invention.

Operation

The operation of the milking apparatus described is as follows:

Partial vacuum will be maintained in the container 8 during the milking operation through the tube 24, check valve 27 and nipple 22. To start the milking apparatus into action, the cut-off valve must be set in the position shown in Fig. 5, so that the partial vacuum will then be effective (a) on the inner chambers of the teat cups through the milk tubes 41 and 38, and (b) on the pulsator through chamber 14, port 11, and nipple 34. Under the action of the pulsator, the suction or partial vacuum pulsations will be rendered effective on the outer chambers of the teat cups through nipple 36 and tubes 40 and 39. The manner in which the double-chambered teat cups operate under the action of suction on the inner chambers, and pulsations on their outer chambers is well understood in this art. It is now important to note that the tube 21 extends high above the bottom of the chamber 14 so that any milk vapors that may condense in said chamber will not be drawn to the pulsator, but will run back through duct 20, ports 17, groove 18 and notch 19 into the container. Moreover, it should be noted that when valve 13 is turned ninety degrees so as to close port 11 and the nipple 12, chamber 14 will still be connected to the interior of the container 8 and subjected to partial vacuum so that chamber 14 will then also be completely drained. Moreover, it should be noted that when port 11 is thus closed, port 16 at its bottom will be connected through leakage passage 43, groove 18, and notch 19 to the interior of the container, so that said port 16 will be cleared of any condensed vapors, thus preventing condensed vapors from passing to the pulsator. The socalled leakage groove 43 will, of course, be open while valve 13 is in the position shown in Fig. 5, and the milking apparatus is then in operation, but its conducting capacity is so slight as compared with that of the ports, the duct 20 and the tube 21 that it will not change or affect the milking operation proper, nor the action of the pulsator but will function only as a slow leakage drainer for the port 16.

Under the operation above described, the milk uncommingled with air will be drawn from the inner chambers of the teat cups through the milk pipe 41 into the valve port 17 before any air from the pulsator will be delivered thereto; but when the milk reaches the port 17, air from the pulsator will be commingled therewith and the milk then commingled with air will be delivered from port 17 through groove 18 and channel 19 into the milk container or pail, and the air, of course, will be drawn from the pail out through the nipple 22. When the milk flow is at maximum, it will keep the port 17 well filled with milk and the milk, to some extent, will restrict the flow of air from the pulsator into the milk container so that the pulsating action will then be relatively slow and the vacuum reduced in the teat cups. When the milk flow decreases, as during the stripping action, the flow of air through the port 17 will be freer, that is, the suction or partial vacuum in the milk container will be more quickly effective in the pulsator and the pulsations will then become relatively rapid, and higher vacuum in the teat cups. These actions are what is most desired in a milking apparatus in that it closely approximates the hand milking action especially during the stripping operation.

The pulsator is made readily detachable from the cover. In applying it on the cover, nipple 34 is simply inserted into port 11 and the pulsator is pressed toward the casing 10 so as to slightly compress the pliable gasket 45 and then the pulsator is securely anchored in its set position by tightening of the thumb nuts 33. Obviously, the pulsator may be also very quickly removed for the purpose of cleaning. Moreover, the valve 13 can be readily lifted out of working position at any time for the purpose of cleaning. Again the valve housing 23 and parts connected thereto may be readily removed from the cover for the purpose of cleaning, first, by unscrewing the cap 28, then by applying a wrench to the flattened head 26, tube 24 can be unscrewed thereby releasing the head 23. When tube 24 is then removed from the housing 23, its flange 25 will scrape the interior walls of the housing substantially clean. Of course, the housing and tube may be quickly reapplied to the cover by operations in reverse order from those just described.

In actual practice, this milking apparatus has been found not only efficient but very satisfactory and highly desirable milking apparatus that is substantially fool-proof in operation, sanitary and reliable.

What I claim is:

1. In a milking apparatus, a milk container in which partial vacuum is arranged to be maintained, a pulsator mounted on said container, a milk-conducting conduit leading to said container, an air-conducting conduit leading from said pulsator to said container, a common valve arranged to be set in one position to open both of said conduits and to be set in another position to close both of said conduits, said valve being of the plug valve type and having a chamber in its head, and conduits connecting said chamber to air and milk controlling ports of said valve, the milk controlling port being in constant communication with the interior of said container.

2. In a milking apparatus, a milk container having a removable cover, an upright valve casing on said cover having circumferentially spaced milk and air ports, a valve working in said casing and provided with milk and air ports for co-operation, respectively, with the milk and air ports of said casing, the milk port of said valve being in constant communication with the interior of said milk container, said valve having a chamber in its upper portion, the upper portion of said milk port of said valve being connected to the upper chamber of said valve, a tubular conduit leading from the upper portion of the air port of said valve to a point in said valve chamber materially above the bottom thereof, a pulsator applied on said cover and having an air nipple connected to the air port of said valve casing, a cluster of double-chambered teat cups, and flexible milk and air tubes connecting the inner and outer chambers of said teat cups, respectively to the milk port of said valve casing and to said pulsator.

3. The structure defined in claim 2 in which said pulsator is detachable from said cover and its air nipple is detachable from the air port of said valve casing.

4. The structure defined in claim 2 in which said valve is provided with a detachable cap normally closing the upper end chamber thereof.

5. The structure defined in claim 2 in which said valve has a small leakage groove connecting the air port thereof to the interior of the milk container.

6. In a milking apparatus, a milk container in which partial vacuum is arranged to be maintained, a pulsator mounted on said container, a milk-conducting conduit leading to said container, an air-conducting conduit leading from said pulsator to said container, a common valve arranged to be set in one position to open both of said conduits, and to be set in another position to close both of said conduits, said valve having a chamber, and conduits connecting said chamber to air and milk controlling ports of said valve, but milk controlling ports being in constant communication with the interior of said container.

In testimony whereof I affix my signature.

LAURITS DINESEN.